(12) United States Patent
Minagawa et al.

(10) Patent No.: US 12,160,714 B2
(45) Date of Patent: Dec. 3, 2024

(54) SOUND PROCESSING APPARATUS, SOUND PROCESSING SYSTEM, SOUND PROCESSING METHOD, AND NON-TRANSITORY COMPUTER READABLE MEDIUM STORING PROGRAM

(71) Applicant: NEC Corporation, Tokyo (JP)

(72) Inventors: Nobuyuki Minagawa, Tokyo (JP); Kazunori Ohashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 148 days.

(21) Appl. No.: 17/911,205

(22) PCT Filed: Mar. 24, 2021

(86) PCT No.: PCT/JP2021/012288
§ 371 (c)(1),
(2) Date: Sep. 13, 2022

(87) PCT Pub. No.: WO2021/193734
PCT Pub. Date: Sep. 30, 2021

(65) Prior Publication Data
US 2023/0101693 A1 Mar. 30, 2023

(30) Foreign Application Priority Data
Mar. 26, 2020 (JP) ................. 2020-056340

(51) Int. Cl.
*H04R 3/00* (2006.01)
*G06F 3/01* (2006.01)
(Continued)

(52) U.S. Cl.
CPC ............. *H04R 3/00* (2013.01); *G06F 3/013* (2013.01); *H04R 1/406* (2013.01); *H04S 7/304* (2013.01)

(58) Field of Classification Search
CPC ... H04R 1/406; H04R 1/30; H04S 7/303–304; H04S 7/306; G06F 3/013
(Continued)

(56) References Cited

U.S. PATENT DOCUMENTS 9,979,499 B2 * 5/2018 Oldfield ............... G10H 1/0008
10,656,903 B1 * 5/2020 Hirst ................... H04N 21/4394
(Continued)

FOREIGN PATENT DOCUMENTS

| CA | 3007511 A1 * | 8/2017 | .............. G06F 3/011 |
|---|---|---|---|
| JP | H08-205278 A | 8/1996 | |

(Continued)

OTHER PUBLICATIONS

International Search Report for PCT Application No. PCT/JP2021/012288, mailed on Jun. 1, 2021.

*Primary Examiner* — Disler Paul
(74) *Attorney, Agent, or Firm* — Sughrue Mion, PLLC

(57) ABSTRACT

A sound processing apparatus capable of appropriately providing a user with a sound related to a desired area in the field of the large venue is provided. A positional relation specifying unit (2) specifies a positional relation between a field and a one user. A sound acquisition unit (4) acquires a sound from at least one sound collection device that collects a sound in each of a plurality of areas of the field. A direction determination unit (6) determines a direction in which the user is facing. A gaze position determination unit (8) determines a gaze position which is a position viewed by the user based on the positional relation and the direction in which the user is facing. A sound providing unit (10) performs processing for providing the user with the sound related to the area corresponding to the gaze position.

9 Claims, 11 Drawing Sheets

(51) Int. Cl.
*H04R 1/40* (2006.01)
*H04S 7/00* (2006.01)

(58) Field of Classification Search
USPC .................................... 381/74, 309–310, 92
See application file for complete search history.

(56) References Cited

U.S. PATENT DOCUMENTS

| | | | |
|---|---|---|---|
| 11,330,388 B2* | 5/2022 | Benattar | ................ H04S 7/303 |
| 11,561,610 B2* | 1/2023 | Correia | .............. A63B 69/0071 |
| 2016/0034251 A1 | 2/2016 | Sendai et al. | |

FOREIGN PATENT DOCUMENTS

| | | | | |
|---|---|---|---|---|
| JP | 2003-062327 A | 3/2003 | | |
| JP | 2009-111833 A | 5/2009 | | |
| JP | 2012-029209 A | 2/2012 | | |
| JP | 2013-240000 A | 11/2013 | | |
| JP | 2016-033764 A | 3/2016 | | |
| JP | 2019-033497 A | 2/2019 | | |
| WO | WO-2019186079 A1 * | 10/2019 | ............. | G06F 3/165 |

* cited by examiner

SOUND PROCESSING APPARATUS, SOUND PROCESSING SYSTEM, SOUND PROCESSING METHOD, AND NON-TRANSITORY COMPUTER READABLE MEDIUM STORING PROGRAM

This application is a National Stage Entry of PCT/JP2021/012288 filed on Mar. 24, 2021, which claims priority from Japanese Patent Application 2020-056340 filed on Mar. 26, 2020, the contents of all of which are incorporated herein by reference, in their entirety.

TECHNICAL FIELD

The present invention relates to a sound processing apparatus, a sound processing system, a sound processing method, and a non-transitory computer readable medium storing program.

BACKGROUND ART

There are techniques for collecting a sound from a sound source in a certain direction. Regarding the above technique, Patent Literature 1 discloses an electronic device having an array microphone having a directivity and recording sound collected by the array microphone. The electronic device according to Patent Literature 1 estimates a sound source direction based on the sound collected by the array microphone, and displays an image indicating the sound source direction on a display unit based on the estimated sound source direction. Further, the electronic device according to Patent Literature 1 specifies a sound source direction when an input operation to the image is received, and sets a directivity direction of the array microphone based on the specified sound source direction.

CITATION LIST

Patent Literature

[Patent Literature 1] Japanese Unexamined Patent Application Publication No. 2013-240000

SUMMARY OF INVENTION

Technical Problem

A large venue, where an event such as a sports event is held, is provided with a field where the event is held and a spectator stand around the field. In the field, a plurality of sound sources may be generated by a plurality of players. Also, in the spectator stand, loud cheers may be generated by a plurality of spectators. Because of such a situation in the large venue, according to the techniques disclosed in the Patent Literature 1, it is difficult to appropriately provide a user with a sound related to an area in which the user desires to hear in the field.

The present disclosure has been made in order to solve the aforementioned problem and an object of the present disclosure is to provide a sound processing apparatus, a sound processing system, a sound processing method, and a program capable of appropriately providing a user with a sound related to a desired area in the field of the large venue.

Solution to Problem

A sound processing apparatus according to the present disclosure includes: positional relation specifying means for specifying a positional relation between a field, where an event is held and around which a spectator stand for a plurality of spectators is provided, and at least one user in the spectator stand; sound acquisition means for acquiring a sound from at least one sound collection device that collects a sound in each of a plurality of predetermined areas related to the field; direction determination means for determining a direction in which the user is facing; gaze position determination means for determining a gaze position which is a position viewed by the user based on the specified positional relation and the determined direction; and sound providing means for performing processing for providing the user with the sound related to the area corresponding to the determined gaze position.

Further, a sound processing system according to the present disclosure includes: at least one sound collection device configured to collect a sound in each of a plurality of predetermined areas of a field, where an event is held and around which a spectator stand for a plurality of spectators is provided; and a sound processing apparatus. The sound processing apparatus includes: positional relation specifying means for specifying a positional relation between the field and at least one user in the spectator stand; sound acquisition means for acquiring a sound from the sound collection device; direction determination means for determining a direction in which the user is facing; gaze position determination means for determining a gaze position which is a position viewed by the user based on the specified positional relation and the determined direction; and sound providing means for performing processing for providing the user with the sound related to the area corresponding to the determined gaze position.

Further, a sound processing method according to the present disclosure includes: specifying a positional relation between a field, where an event is held and around which a spectator stand for a plurality of spectators is provided, and at least one user in the spectator stand; acquiring a sound from at least one sound collection device that collects a sound in each of a plurality of predetermined areas related to the field; determining a direction in which the user is facing; determining a gaze position which is a position viewed by the user based on the specified positional relation and the determined direction; and providing the user with the sound related to the area corresponding to the determined gaze position.

Further, a program according to the present disclosure causes a computer to execute the following steps of: specifying a positional relation between a field, where an event is held and around which a spectator stand for a plurality of spectators is provided, and at least one user in the spectator stand; acquiring a sound from at least one sound collection device that collects a sound in each of a plurality of predetermined areas related to the field; determining a direction in which the user is facing; determining a gaze position which is a position viewed by the user based on the specified positional relation and the determined direction; and providing the user with the sound related to the area corresponding to the determined gaze position.

Advantageous Effects of Invention

According to the present disclosure, it is possible to provide a sound processing apparatus, a sound processing system, a sound processing method, and a program capable of appropriately providing a user with a sound related to a desired area in the field of the large venue.

EXAMPLE EMBODIMENT

Outline of Example Embodiments According to the Present Disclosure

Figure 1:
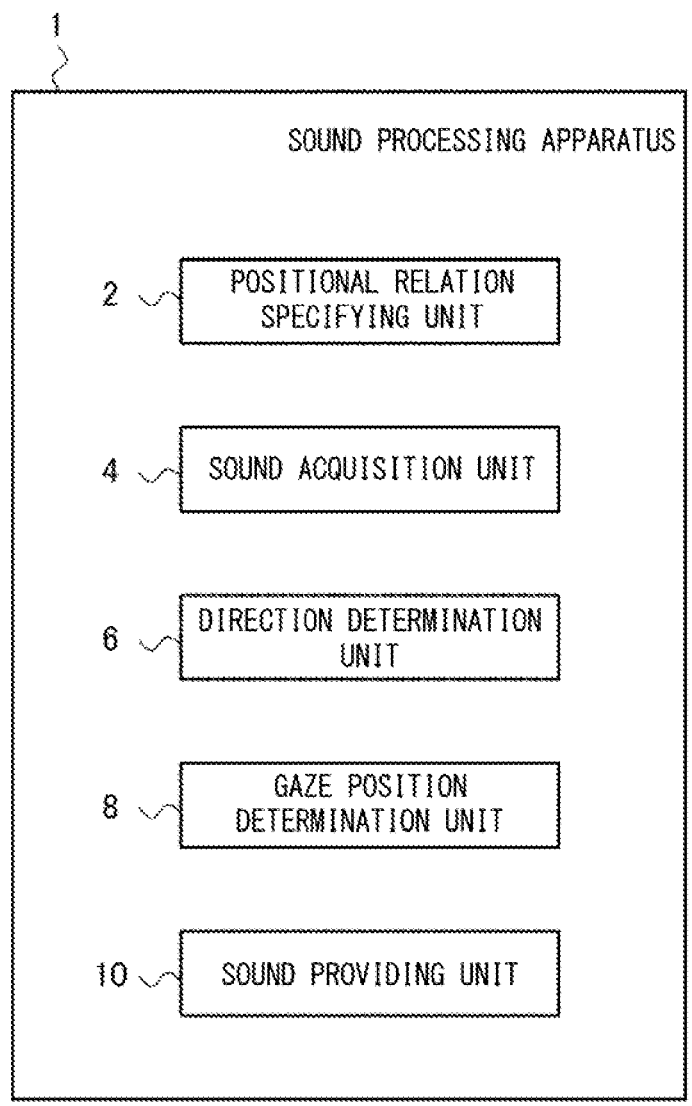
FIG. 1 is a diagram showing an outline of a sound processing apparatus according to an example embodiment of the present disclosure.

Prior to giving the description of example embodiments of the present disclosure, an outline of the example embodiments according to the present disclosure will be described. FIG. 1 is a diagram showing an outline of a sound processing apparatus 1 according to an example embodiment of the present disclosure. The sound processing apparatus 1 is, for example, a computer such as a server.

The sound processing apparatus 1 provides a user with a sound related to each area of a field in the large venue according to a direction in which the user is facing. A "large venue" is a large-scale event venue provided with a field where an event is held and a spectator stand for a plurality of spectators which surrounds the field. Large venues include, but are not limited to, stadiums, sports arenas, soccer stadiums, and baseball stadiums. A field includes, for example, a ground, a court or the like, but is not limited thereto. The field may be either outdoors or indoors. The event held on the field may, for example, be a sports event, but is not limited to a sports event.

The sound processing apparatus 1 includes a positional relation specifying unit 2, a sound acquisition unit 4, a direction determination unit 6, a gaze position determination unit 8 and a sound providing unit 10. The positional relation specifying unit 2 includes a function as positional relation specifying means. The sound acquisition unit 4 includes a function as sound acquisition means. The direction determination unit 6 includes a function as direction determination means. The gaze position determination unit 8 includes a function as gaze position determination means. The sound providing unit 10 includes a function as sound providing means.

Figure 2:
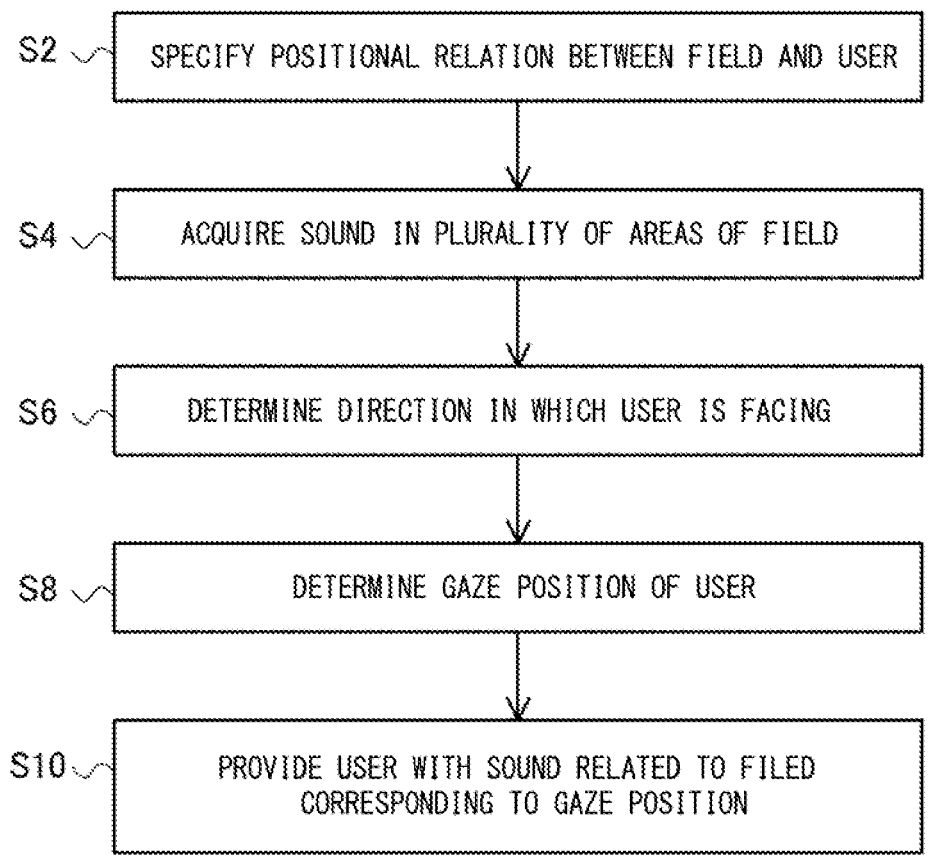
FIG. 2 is a flowchart showing a sound processing method executed by the sound processing apparatus according to the example embodiment of the present disclosure.

FIG. 2 is a flowchart showing a sound processing method executed by the sound processing apparatus 1 according to the example embodiment of the present disclosure. The positional relation specifying unit 2 specifies a positional relation between the field, where an event is held and around which the spectator stand (stands, etc.) for a plurality of spectators is provided, and at least one user in the spectator stand (Step S2). That is, in this example embodiment, the "user" can be a spectator. The method of specifying the positional relation will be described later.

The sound acquisition unit 4 acquires a sound from at least one sound collection device that collects a sound in each of a plurality of predetermined areas related to the field (Step S4). That is, the sound acquisition unit 4 acquires the sound in a plurality of areas of the field. Note that a sound collection device may be provided in each of a plurality of areas of the field. The plurality of areas of the field will be described later.

The direction determination unit 6 determines the direction in which the user is facing (Step S6). The direction in which the user is facing may be, for example, the direction in which the user's face is facing, the direction of the user's line of sight, or the direction obtained from at least one of these directions. The gaze position determination unit 8 determines the gaze position, which is the position viewed by the user, based on the positional relation specified in the process in S2 and the direction determined in the process in S6 (Step S8).

The sound providing unit 10 performs processing for providing the user with the sound related to the area corresponding to the gaze position determined in the process in S8 (Step S10). The "processing for providing the user with the sound" may be, for example, a processing for transmitting sound data (i.e., audio data) indicating the sound to a sound output device (i.e., audio output device) for outputting the sound to the user. The sound output device is, for example, a speaker or an earphone located near the user.

As described above, in the large venue, a plurality of sound sources are generated in the field, and in addition, loud cheers and the like can be generated from the spectator stand. An individual user may wish to listen to the sound in a particular area of the field in such a large venue. However, as described above, since there are a plurality of sound sources in the large venue, it is difficult for an individual user to listen to the sound in the area which the user wants to listen to.

On the other hand, since the sound processing apparatus 1 according to the present disclosure is configured as described above, it is possible to provide the user with the sound related to the area that the user gazes at in the field of the large venue. The area that the user gazes at is the area that the user is interested in, and thus there is a high possibility that the user wants to listen to the sound in this area. Therefore, it is possible to appropriately provide the user with the sound regarding the desired area in the field of the large venue. That is, the sound in the area desired by an individual user can be provided to the user.

It is possible to appropriately provide the user with the sound regarding the desired area in the field of the large venue also by using a sound processing system including the sound processing apparatus 1, at least one sound collection device and the sound output device. Further, it is possible to appropriately provide the user with the sound regarding the desired area in the field of the large venue also by using the sound processing method executed by sound processing apparatus 1 and a program for executing the sound processing method.

First Example Embodiment

Hereinafter, with reference to the drawings, example embodiments will be described. In order to clarify the explanation, the following descriptions and the drawings are omitted and simplified as appropriate. Further, throughout the drawings, the same components are denoted by the same reference symbols and overlapping descriptions are omitted as necessary.

Figure 3:
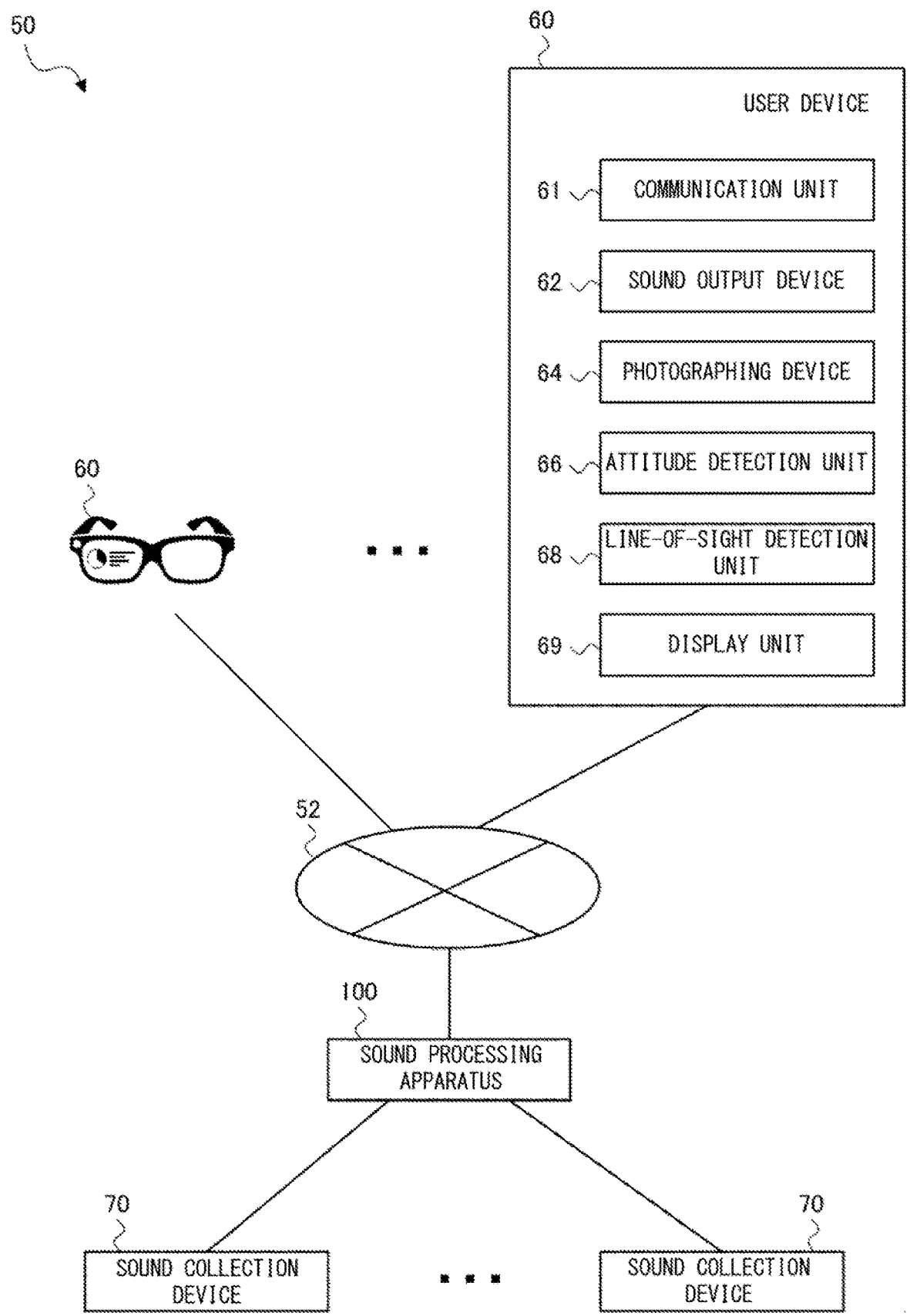
FIG. 3 is a diagram showing a sound processing system according to a first example embodiment.

FIG. 3 is a diagram showing a sound processing system 50 according to the first example embodiment. The sound processing system 50 includes at least one user device 60, at least one sound collection device 70, and the sound processing apparatus 100. The sound processing apparatus 100 corresponds to the sound processing apparatus 1 shown in FIG. 1. The user device 60 and the sound processing apparatus 100 are communicably connected to each other via a wired or wireless network 52. The sound collection device 70 and the sound processing apparatus 100 are communicably connected to each other via a wire or wirelessly. Note that the sound collection device 70 and the sound processing apparatus 100 may be communicatively connected to each other via the network 52.

The sound processing system 50 collects sounds in a plurality of predetermined areas of the field, where an event is held and around which the spectator stand (stands, etc.) for a plurality of spectators is provided. Then, the sound processing system 50 provides a sound related to the area corresponding to the gaze position of a certain user to the user.

The sound collection device 70 is, for example, a microphone. The sound collection device 70 may be disposed in each of a plurality of predetermined areas of the field. That is, preferably, a plurality of the sound collection devices 70 are disposed in each of the plurality of areas. The sound collection device 70 collects the sound in the corresponding area. The sound collection device 70 is preferably a directional microphone in order to appropriately collect the sound in the corresponding area. The sound collection device 70 transmits a sound signal corresponding to the collected sound to the sound processing apparatus 100.

The sound processing apparatus 100 is, for example, a computer such as a server. The sound processing apparatus 100 acquires the sound in each of the areas from the sound collection devices 70, and performs processing for providing the user with the sound regarding the area corresponding to the user's gaze position. Specifically, the sound processing apparatus 100 transmits the sound data of the sound regarding the area corresponding to the user's gaze position to the user device 60. The details of the sound processing apparatus 100 will be described later.

The user device 60 is a device that can be attached to each of the users of the sound processing system 50. The user device 60 may be composed of, for example, a smart glass such as an augmented reality (AR) glass. Alternatively, the user device 60 may be an information processing terminal such as a smart phone or a device having an information processing terminal. The user device 60 can be mounted on the head of the user. The user device 60 includes at least a communication unit 61 and a sound output device 62. The user device 60 may also include a photographing device 64, an attitude detection unit 66, a line-of-sight detection unit 68, and a display unit 69. In particular, the user device 60 may not include either the attitude detection unit 66 or the line-of-sight detection unit 68. These components of user device 60 may also be physically separate from each other.

The communication unit 61 performs processing for communicating with the sound processing apparatus 100 via the network 52. The sound output device 62 reproduces the sound data received from the sound processing apparatus 100. The sound output device 62 is, for example, an earphone or a speaker. The photographing device 64 is, for example, an imaging element or a camera. The photographing device 64 photographs a front view of the user and transmits the obtained photographed image information to the sound processing apparatus 100. The photographing device 64 may, for example, photograph a field while a user in his/her seat is wearing the user device 60.

The attitude detection unit 66 is, for example, a gyro sensor. The attitude detection unit 66 detects an attitude (inclination) of the user device 60. Specifically, the attitude detection unit 66 detects the inclination (angle) of the user device 60 in the XYZ three-dimensional coordinate system (three-dimensional coordinate space). The attitude detection unit 66 transmits attitude information indicating the detected attitude to the sound processing apparatus 100.

The line-of-sight detection unit 68 detects (estimates) the direction of gaze (hereinafter, line-of-sight direction) of the user. Note that the estimation of the line-of-sight direction can be realized by an existing method. For example, the line-of-sight detection unit 68 may detect the line-of-sight direction of the user by detecting the user's eyes and pupils. The line-of-sight detection unit 68 transmits line-of-sight information indicating the detected line-of-sight direction to the sound processing apparatus 100.

The display unit 69 outputs a predetermined image so that a user can visually recognize it. For example, the display unit 69 may project the image onto the glass portion of the smart glasses. Alternatively, the display unit 69 may include a display for displaying the image.

Figure 4:
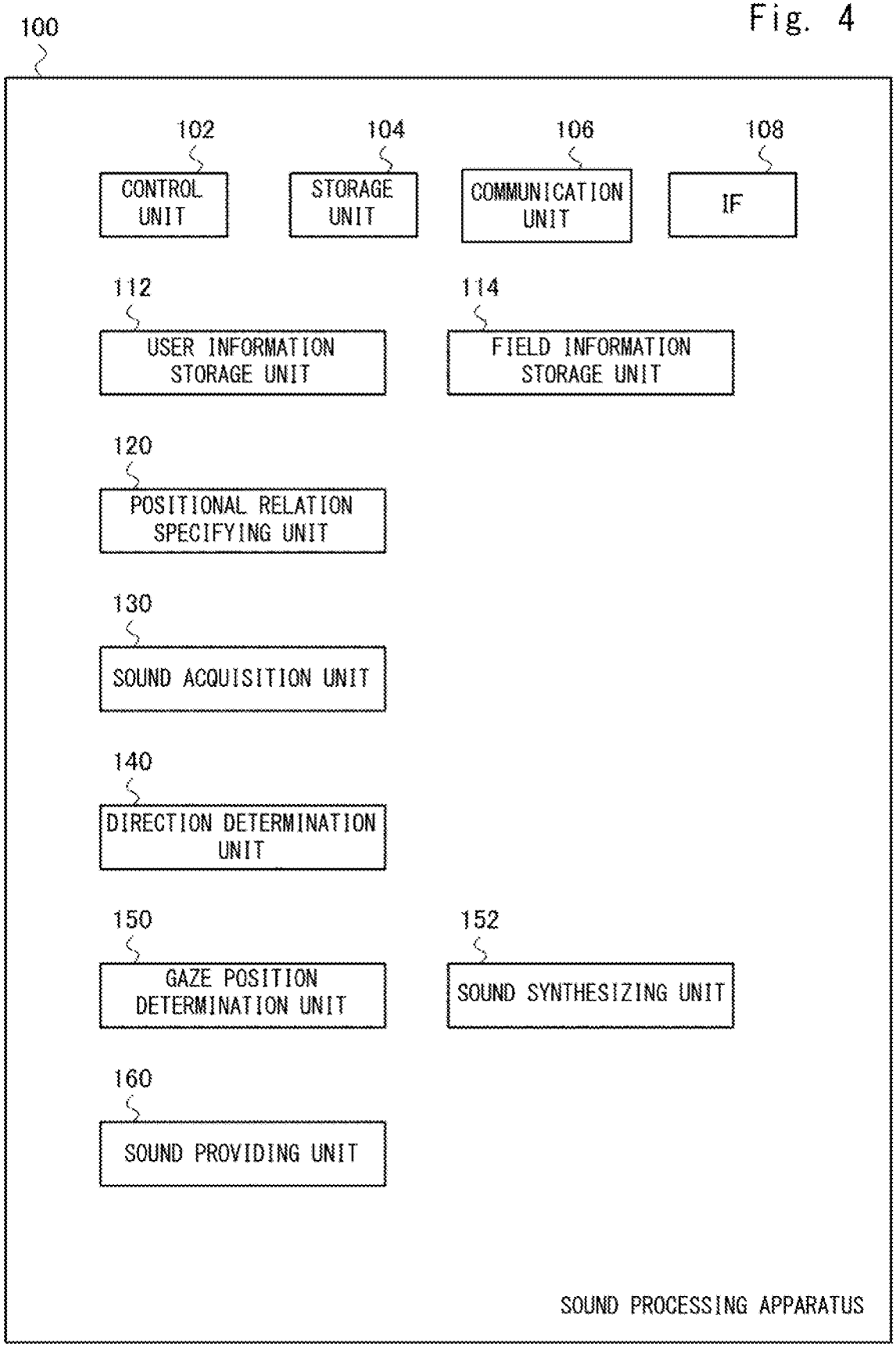
FIG. 4 is a diagram showing a configuration of a sound processing apparatus according to the first example embodiment.

FIG. 4 is a diagram showing a configuration of the sound processing apparatus 100 according to the first example embodiment. The sound processing apparatus 100 includes, as main hardware configurations, a control unit 102, a storage unit 104, a communication unit 106, and an interface unit (IF) 108. The control unit 102, the storage unit 104, the communication unit 106, and the interface unit 108 are connected to one another via a data bus or the like. The user device 60 shown in FIG. 3 may also include the hardware configuration shown in FIG. 4.

The control unit 102 is, for example, a processor such as a Central Processing Unit (CPU). The control unit 102 has a function as an arithmetic apparatus that performs, for example, control processing and arithmetic processing. The storage unit 104 is, for example, a storage device such as a memory or a hard disc. The storage unit 104 is, for example, a Read Only Memory (ROM) or a Random Access Memory (RAM). The storage unit 104 has a function for storing, for example, a control program(s) and an arithmetic program(s) executed by the control unit 102. Further, the storage unit 104 has a function for temporarily storing processing data and the like. The storage unit 104 may include a database.

The communication unit 106 performs processing necessary for communicating with the user device 60 and the sound collection device 70. The communication unit 106 may include, for example, a communication port, a router, and a firewall. The interface unit (IF) 108 is, for example, a user interface (UI). The interface unit 108 includes an input device such as a keyboard, a touch panel, or a mouse, and an output device such as a display or a speaker. The interface unit 108 receives an operation of inputting data performed by a system administrator and outputs information to the system administrator.

The sound processing apparatus 100 according to the first example embodiment includes, as components, a user information storage unit 112, a field information storage unit 114, a positional relation specifying unit 120, a sound acquisition unit 130, and a direction determination unit 140. The sound processing apparatus 100 according to the first example embodiment includes, as components, a gaze position determination unit 150, a sound synthesizing unit 152, and a sound providing unit 160.

The user information storage unit 112 includes a function as user information storage means. The field information storage unit 114 includes a function as field information storage means. The positional relation specifying unit 120 corresponds to the positional relation specifying unit 2 shown in FIG. 1. The positional relation specifying unit 120 includes a function as positional relation specifying means. The sound acquisition unit 130 corresponds to the sound acquisition unit 4 shown in FIG. 1. The sound acquisition unit 130 includes a function as sound acquisition means. The direction determination unit 140 corresponds to the direction determination unit 6 shown in FIG. 1. The direction determination unit 140 includes a function as direction determination means.

The gaze position determination unit 150 corresponds to the gaze position determination unit 8 shown in FIG. 1. The gaze position determination unit 150 includes a function as gaze position determination means. The sound synthesizing unit 152 includes a function as sound synthesizing means. The sound providing unit 160 corresponds to the sound providing unit 10 shown in FIG. 1. The sound providing unit 160 includes a function as sound providing means.

Note that each of the aforementioned components may be implemented, for example, by executing a program under the control of the control unit 102. More specifically, each of the components may be implemented by the control unit 102 executing a program stored in the storage unit 104. Further, each of the components may be implemented by installing a necessary program stored in any nonvolatile recording medium as required. Further, each of the components is not necessarily implemented by software executed by a program, and may instead be implemented, for example, by any combination of hardware, firmware, and software. Each component may also be implemented using a user-programmable integrated circuit such as, for example, a field-programmable gate array (FPGA) or a microcomputer. In this case, the integrated circuit may be used to realize a program composed of the above components. The foregoing is also applicable to other embodiments described later. The specific functions of the components other than the user information storage unit 112 and the field information storage unit 114 will be described later with reference to FIG. 6.

A user information storage unit 112 stores information (user information) about a user. The user information may include identification information of one or more users (or the user device 60) in their seats and user position information indicating the position of the corresponding user (or the user device 60). The user position information may indicate the position of the user in the three-dimensional coordinate system. The method of generating the user position information will be described later. The user information may also include identification information of the area which the corresponding user is currently gazing at, determined by a process described later.

A field information storage unit 114 stores information (field information) about a field where an event is held. The field information may include identification information of each of a plurality of areas of the field, area position information indicating the position (range) of each of the areas, and identification information of the sound collection device 70 corresponding to each of the areas.

Figure 5:
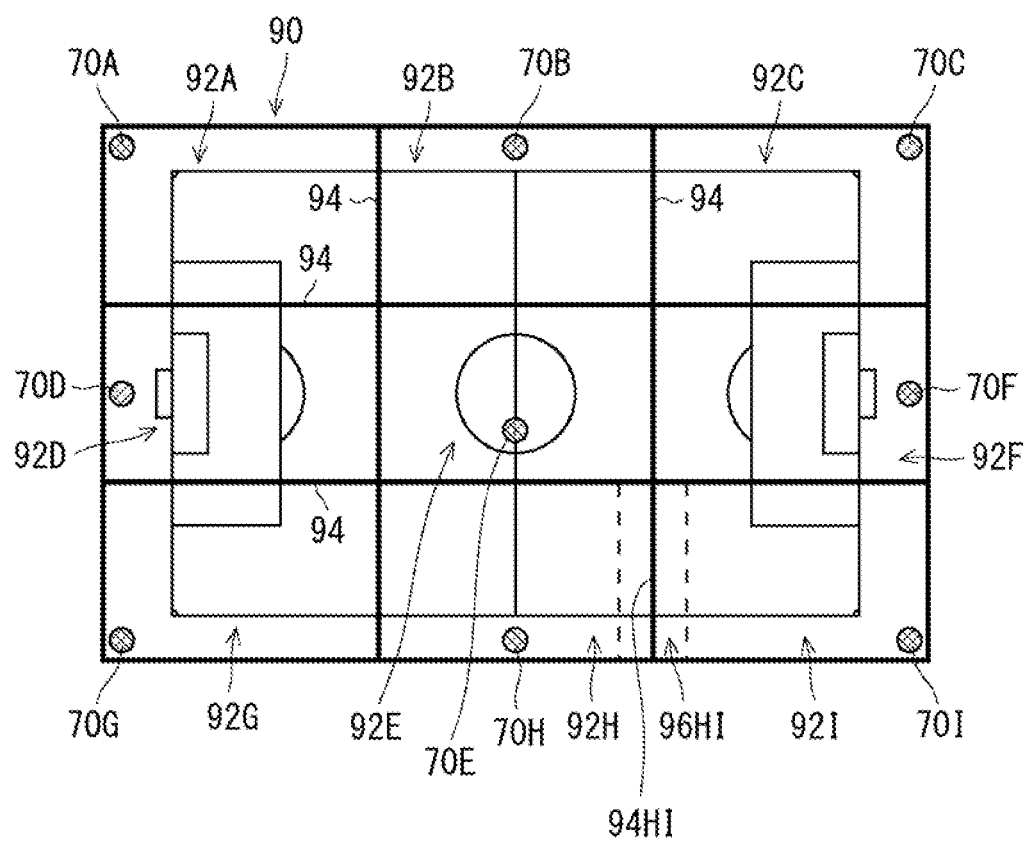
FIG. 5 is a diagram illustrating a field to which the sound processing system according to the first example embodiment is applied.

FIG. 5 is a diagram illustrating a field 90 to which the sound processing system 50 according to the first example embodiment is applied. In the example of FIG. 5, the field 90, which is a soccer ground, is shown. The field 90 is divided into nine areas 92A to 92I. The sound collection devices 70 (devices 70A to 70I) are disposed in the areas 92A to 92I, respectively. The sound collection devices 70A to 70I may collect the sound in the areas 92A to 92I, respectively. The sound collection devices 70 are located at positions where the sounds of the corresponding areas 92 can be collected. For example, the sound collection devices 70 may be located on the ground (or the floor) of the corresponding areas 92. Alternatively, the sound collection devices 70 may be located above the corresponding areas 92.

The position (range) of each of the areas 92A to 92I is determined in advance by the area position information stored in the field information storage unit 114. The area position information may indicate a range in the XYZ three-dimensional coordinate system for each of the areas 92. Thus, when a certain position is specified in the field 90, it is possible to grasp to which area 92 among the areas 92A to 92I the position corresponds, that is, in which area 92 the position is included.

A boundary portion may be provided near the boundary 94 of two or more adjacent areas 92. The range of the boundary portion is determined in advance. For example, the boundary portion may have a range of about five to several tens of meters from the boundary. The field information storage unit 114 may store boundary portion information indicating the range in a three-dimensional coordinate system for the boundary portion. The boundary portion information may be included in the area position information. As an example, in FIG. 5, the boundary portion 96HI provided near the boundary 94HI between the area 92H and the area 92I is indicated by a dashed line. In this manner, a boundary portion 96 may be provided in the vicinity of each of the boundaries 94. The boundary portions 96 need not be provided at all the boundaries 94.

Figure 6:
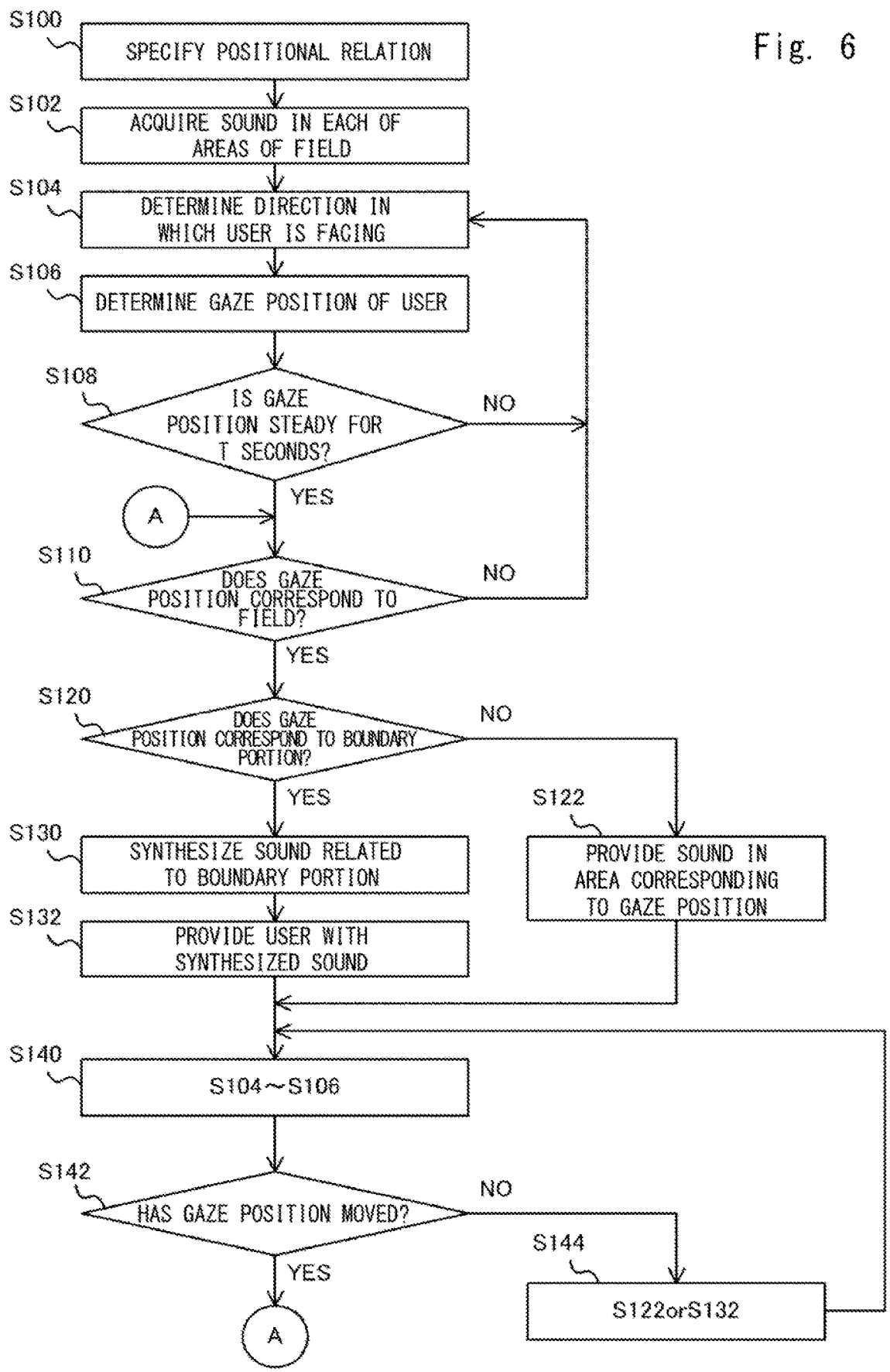
FIG. 6 is a flowchart showing a sound processing method executed by the sound processing apparatus according to the first example embodiment.

FIG. 6 is a flowchart showing a sound processing method executed by the sound processing apparatus 100 according to the first example embodiment. When there are a plurality of users in the spectator stand, the sound processing apparatus 100 performs the processing shown in FIG. 6 for each of the plurality of users.

The positional relation specifying unit 120 specifies the positional relation between the field and the user (Step S100). Specifically, the positional relation specifying unit 120 acquires (receives) information for specifying the positional relation between the field 90 and the user in the user's seat via the network 52. The positional relation specifying unit 120 specifies the positional relation between the field 90 and the user in the spectator stand by using the acquired information. Accordingly, the positional relation specifying unit 120 specifies the position of the user in the three-dimensional coordinate system and generates user position information. The positional relation specifying unit 120 stores the user position information in the user information storage unit 112.

For example, the positional relation specifying unit 120 may acquire (receive) ticket information of the user together with the identification information of the user. The ticket information may be, for example, image information of a ticket photographed by the photographing device 64. In this case, the positional relation specifying unit 120 recognizes the seat number of the user from the image information of the ticket by, for example, Optical Character Recognition (OCR). Accordingly, the positional relation specifying unit 120 specifies the positional relation between the field 90 and the user in the spectator stand. When the user purchases the ticket by online payment, the positional relation specifying unit 120 may acquire the ticket information from the online payment information.

The positional relation specifying unit 120 may acquire (receive) field image information acquired by the photographing device 64 photographing the field 90 while the user in his/her seat is wearing the user device 60, from the user device 60 together with the user identification information. In this case, the positional relation specifying unit 120 specifies the positional relation between the field 90 and the user in the spectator stand by using the field image information.

Figure 7:
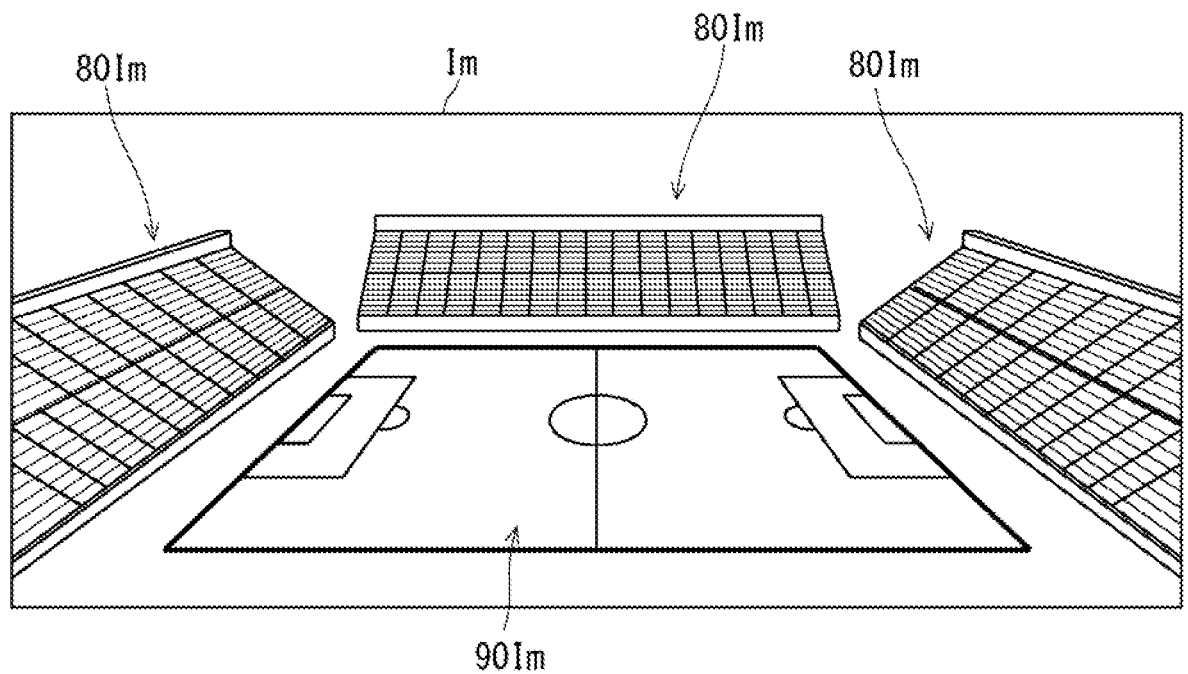
FIG. 7 is a diagram for describing a method of specifying a positional relation between the field and a user in a spectator stand by using field image information, according to the first example embodiment.

FIG. 7 is a diagram for describing a method of specifying a positional relation between the field 90 and the user in the spectator stand by using the field image information, according to the first example embodiment. FIG. 7 illustrates a photographed image Im acquired by photographing by the photographing device 64. The photographed image Im shows a field image 90Im which is an image of the field 90. Although the shape of the field 90 is mainly rectangular, the shape of the field image 90Im in the photographed image Im differs depending on the position of the user (user's seat). In the example of FIG. 7, the shape of the field image 90Im is trapezoidal. Also, depending on the position of the user, the shape of the field image 90Im can be a quadrilateral shape which is neither rectangular nor trapezoidal.

Therefore, the positional relation specifying unit 120 recognizes the field image 90Im from the photographed image Im, and specifies the positional relation between the field 90 and the user from the shape of the recognized field image 90Im. For example, the positional relation specifying unit 120 recognizes the intersection points of the lines drawn in the field 90 from the photographed image Im, and specifies the shape of the field image 90Im from the distance between the intersection points. Then, for example, the positional relation specifying unit 120 specifies the positional relation between the field 90 and the user by analyzing (simulating) from which viewpoint the specified shape of the field image 90Im in the three-dimensional space can be acquired. The positional relation specifying unit 120 may specify the positional relation between the field 90 and the user by using an image outside the field 90, such as the spectator stand image 80Im which is an image of the spectator stand. The positional relation specifying unit 120 may specify the positional relation between the field 90 and the user from the photographed image Im by using a machine learning algorithm.

Return to the description of FIG. 6. The sound acquisition unit 130 acquires the sound in each of the plurality of areas 92 of the field 90 (Step S102). Note that the processing in S102 may be continuously performed regardless of the operation of the user during the operation of the sound processing system 50. In other words, the processing in S102 may be continuously performed regardless of subsequent processing. In other words, the processing in S102 may be performed independently of the subsequent processing.

Specifically, the sound acquisition unit 130 acquires (receives) a sound signal corresponding to the collected sound from each of the sound collection devices 70A to 70I disposed in each of the areas 92A to 92I, together with the identification information of the sound collection device 70. When the sound processing apparatus 100 is connected to the sound collecting apparatuses 70 via separate cables, the sound acquisition unit 130 need not receive the identification information of the sound collection device 70. If the received sound signal is an analog signal, the sound acquisition unit 130 may convert the sound signal into a digital signal. Accordingly, the sound acquisition unit 130 may generate a pulse code modulation (PCM) sound source.

The direction determination unit 140 determines the direction in which the user is facing in the three-dimensional coordinate system (Step S104). Specifically, the direction determination unit 140 acquires (receives) the attitude information from the user device 60. When the user device 60 is attached to the user's face, the attitude of the user device 60 changes as the direction of the user's face changes. Therefore, the direction determination unit 140 may determine the direction of the user's face to be the direction in which the user is facing (user direction) by using the attitude information. That is, the direction determination unit 140 detects in which direction the user device 60, i.e., the user's face, is facing in the three-dimensional coordinate space.

Alternatively, the direction determination unit 140 acquires (receives) line-of-sight information from the user device 60. The direction determination unit 140 may determine the direction of the user's line of sight to be the direction in which the user is facing (user direction) by using the line-of-sight information. That is, the direction determination unit 140 detects in which direction the user's line of sight points in the three-dimensional coordinate space. Alternatively, the direction determination unit 140 may acquire (receive) the attitude information and the line-of-sight information from the user device 60 and determine the user direction by using at least one of them. For example, the direction determination unit 140 may determine the user direction by preferentially using the attitude information. At this time, the direction determination unit 140 may correct the user direction, determined by using the attitude information, by using the line-of-sight information.

The gaze position determination unit 150 determines the gaze position of the user (Step S106). Specifically, the gaze position determination unit 150 determines the gaze position by using the positional relation specified in the processing of S100 and the direction determined in the processing of S104. More specifically, the gaze position determination unit 150 determines, by a geometric method, where in the three-dimensional coordinate system the straight line extended in the user direction with the user position indicated by the user position information as a starting point intersects the field 90 or the circumference of the field 90. Accordingly, the gaze position determination unit 150 determines the coordinates (gaze coordinates) corresponding to the gaze position.

The gaze position determination unit 150 determines whether or not the gaze position steadies (i.e., does not move) for T seconds (Step S108). The processing in S108 can be a trigger for providing sound to the user. Here, T is a predetermined time. For example, T is two seconds, i.e., T=2 [seconds], but not limited thereto. The gaze position determination unit 150 may determine that the gaze position does not move if the movement range of the gaze position is within a predetermined range.

When it is determined that the gaze position has moved during T seconds (NO in S108), the gaze position determination unit 150 determines that the user is not gazing at a specific position. In this case, the gaze position determination unit 150 determines that the sound is not provided. Therefore, the processing flow returns to S104. Accordingly, when the user does not desire the provision of the sound, it is possible to prevent or reduce (hereinafter, it may be simply expressed as "prevent") the provision of the sound.

On the other hand, if it is determined that the gaze position does not move for T seconds (YES in S108), the gaze position determination unit 150 determines that the user is gazing at a specific position. In this case, the gaze position determination unit 150 determines whether or not the gaze position corresponds to the field 90 (Step S110). The processing in S110 can be a trigger for providing sound to the user. Specifically, the gaze position determination unit 150 uses the area position information to determine whether or not the gaze coordinates corresponding to the gaze position are included in any of the areas 92A to 92I of the field 90.

If it is determined that the gaze position does not correspond to the field 90 (NO in S110), the gaze position determination unit 150 determines that the user is not gazing at the field 90. In this case, the gaze position determination unit 150 determines that the sound in the field 90 is not provided to the user. In this case, in the first example embodiment, the processing flow returns to S104. Accordingly, when the user does not desire the provision of the sound, it is possible to prevent the provision of the sound.

On the other hand, if it is determined that the gaze position corresponds to the field 90 (YES in S110), the gaze position determination unit 150 determines that the user is gazing at the field 90. In this case, the gaze position determination unit 150 determines that the sound in the field 90 is to be provided to the user. Then, the gaze position determination unit 150 determines whether or not the gaze position corresponds to the boundary portion 96 (Step S120). Specifically, the gaze position determination unit 150 uses the boundary portion information to determine whether the gaze coordinates corresponding to the gaze position are included in the boundary portion 96.

If it is determined that the gaze position does not correspond to the boundary portion 96 (NO in S120), the gaze coordinates can be included in any of the areas 92A to 92I other than the boundary portion 96. Therefore, the gaze position determination unit 150 uses the area position information to determine which of the areas 92A to 92I the gaze position corresponds to other than the boundary portion 96.

Then, the sound providing unit 160 provides the sound in the area 92 corresponding to the gaze position to the user (Step S122). Specifically, the sound providing unit 160 transmits, to the user device 60, the sound signal corresponding to the sound collected by the sound collection device 70 related to the area 92 corresponding to the gaze position, by using the user information. As a result, the user can listen to the sound related to the area 92 corresponding to the gaze position by using the sound output device 62.

Figure 8:
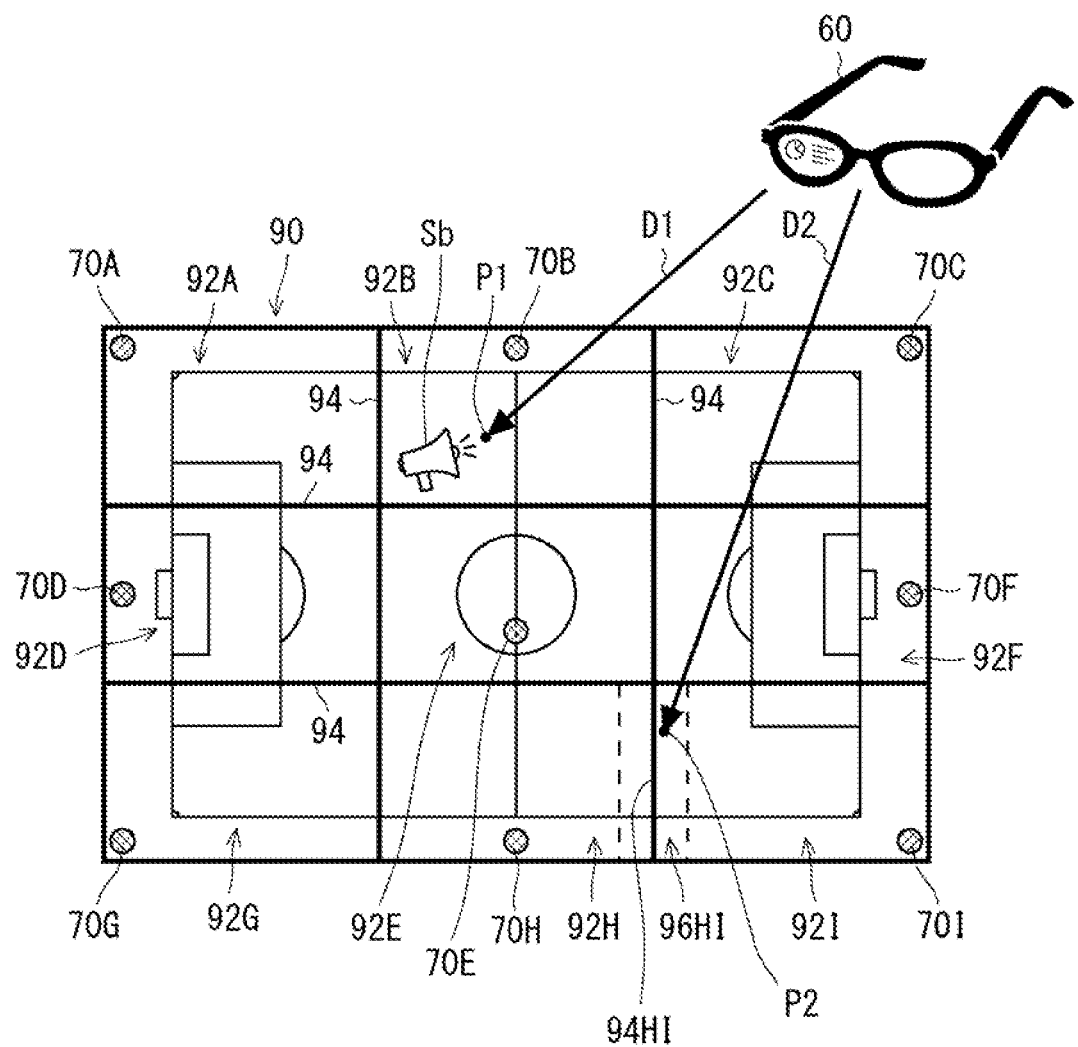
FIG. 8 is a diagram for describing that a user listens to a sound by using the sound processing system according to the first example embodiment.

FIG. 8 is a diagram for describing that a user listens to a sound by using the sound processing system 50 according to the first example embodiment. When the gaze position P1 corresponds to the area 92B, the direction determination unit 140 determines the user direction D1. Then, the gaze position determination unit 150 determines the gaze position P1 on the field 90 from the user direction D1, and determines that the gaze position P1 corresponds to the area 92B. The sound providing unit 160 provides the sound collected by the sound collection device 70B corresponding to the area 92B. Accordingly, the user can have an experience as if he/she is listening to the sound output from the virtual sound source Sb in the area 92B.

Thus, even when a large number of spectators around the user cheer, the user can appropriately listen to the sound of the area 92, on the field 90, on which the user focuses. Also, even if a large number of spectators around the user do not cheer, the user may hear sounds in the area 92 on field 90 other than areas 92 on which the user is not focusing, as noise, similar to cheering. On the other hand, in the present example embodiment, even when the sound is generated from each of a plurality of the areas 92 of the field 90, the user can appropriately listen to the sound of the area 92, on the field 90, in which the user is interested.

For example, in the example of FIG. 8, it is assumed that the user's seat is near the area 92C. It is assumed that the sounds are generated from the area 92C, and the area 92B far from the user. In this case, if the system according to the present example embodiment is not used, even when the user wants to listen to the sound in the area 92B, there is a possibility that the user cannot appropriately listen to the sound in the area 92B because it is drowned out by the sound generated in the area 92C. On the other hand, by using the system according to the present example embodiment, the user can appropriately listen to the sound in the area 92B far from the user even when the sound is generated in the area 92C near the user.

In addition, user A may wish to listen to the sound of a person (e.g., a referee, etc.) in the area 92B, and user B may wish to listen to the sound of a person (e.g., a goalkeeper, etc.) in the area 92D. In this case, the sound providing unit 160 can provide the sound in the area 92B to the user A and the sound in the area 92D to the user B. In this way, by using the system according to the present example embodiment, it is possible to provide the sound in the area desired by an individual user to the user.

Return to the description of FIG. 6. If it is determined that the gaze position corresponds to the boundary portion 96 (YES in S120), the sound synthesizing unit 152 synthesizes sound related to the boundary portion 96 (Step S130). Specifically, the sound synthesizing unit 152 integrates the sounds related to two or more areas 92 corresponding to the boundary portion 96, and generates the synthesized sound which is acquired by integrating the sounds. More specifically, the sound synthesizing unit 152 integrates the sounds acquired from the sound collection device 70 for the two or more areas 92 corresponding to the boundary portion 96. At this time, the sound synthesizing unit 152 may generate the synthesized sound in such a manner that the proportion of the sound regarding the area 92 close to the gaze position in the boundary portion 96, among the two or more areas 92, is increased.

Then, the sound providing unit 160 provides the user with the synthesized sound corresponding to the boundary portion 96 (Step S132). Specifically, the sound providing unit 160 transmits a sound signal corresponding to the synthesized sound to the user device 60 by using the user information. Accordingly, the user can listen to the synthesized sound related to the boundary portion 96 corresponding to the gaze position by using the sound output device 62. By listening to the synthesized sound when the gaze position is near the boundary, the user can more appropriately listen to the sound corresponding to the gaze position. That is, in the vicinity of the boundary 94, there is a high possibility that the sounds regarding two or more areas 92 that are in contact with the boundary 94 can be heard. Therefore, the user can have a listening experience without discomfort in the vicinity of the boundary.

Specific examples of the processing in S130 to S132 will be described with reference to FIG. 8. In FIG. 8, it is assumed that the gaze position P2 beyond the user direction D2 is located at the boundary portion 96HI between the area 92H and the area 92I. When the gaze position P2 is on the boundary 94HI, the sound synthesizing unit 152 integrates the sound acquired from the sound collection device 70H corresponding to the area 92H with the sound acquired from the sound collection device 70I corresponding to the area 92I at a ratio of one to one (i.e., the ratio 1:1).

On the other hand, when the gaze position P2 is located on the area 92H side of the boundary portion 96HI (that is, on the left side of the boundary portion 96HI in FIG. 8), the sound synthesizing unit 152 integrates the sound acquired from the sound collection device 70H with the sound acquired from the sound collection device 70I at a ratio of two to one (i.e., the ratio 2:1). Alternatively, the sound synthesizing unit 152 may generate a synthesized sound in such a manner that the proportion of the sound in the area 92H acquired from the sound collection device 70H is gradually increased as the gaze position P2 separates from the boundary 94 HI and heads to the area 92H side in the boundary portion 96HI. For example, the sound synthesizing unit 152 may generate a synthesized sound so as to increase the proportion of the sound in the area 92H acquired from the sound collection device 70H in proportion to the distance from the boundary 94HI to the gaze position P2 in the boundary portion 96HI.

In the case of performing the above processing, for example, it is assumed that the gaze position P2 moves from the area 92I to the area 92H beyond the boundary 94. In this case, when the gaze position P2 is in the area 92I outside the boundary portion 96HI, the user listens to only the sound related to the area 92I. Then, when the gaze position P2 enters the boundary portion 96HI, the proportion of the sound related to the area 92H in the sound provided to the user gradually increases. When the gaze position P2 reaches the boundary 94HI, the proportion of the sound regarding the area 92I and the proportion of the sound regarding the area 92H becomes the same in the sound provided to the user. When the gaze position P2 is further moved to the area 92H side, the proportion of the sound regarding the area 92H becomes larger than the proportion of the sound regarding the area 92I in the sound provided to the user. Then, in the sound provided to the user, the proportion of the sound regarding the area 92H gradually becomes larger, and when the gaze position P2 exits the boundary portion 96HI, the user listens to only the sound regarding the area 92H. In this way, by providing the synthesized sound to the user when the gaze position is located on the boundary portion 96, it is possible to prevent a sense of incongruity that the sound heard by the user suddenly changes when the gaze position moves across the boundary 94.

Return to the description of FIG. 6. After providing the sound to the user (S122 or S132), the sound processing apparatus 100 performs the processes of S104 to S106 (Step S140). That is, the direction determination unit 140 determines the direction in which the user is facing (S104), and the gaze position determination unit 150 determines the gaze position of the user (S106). Then, the gaze position determination unit 150 determines whether or not the gaze position has moved (Step S142). Specifically, the gaze position determination unit 150 determines whether or not the gaze position determined in the current processing in S106 has changed from the gaze position determined in the previous processing in S106. Note that the gaze position determination unit 150 may determine that the gaze position has not moved if the movement range of the gaze position is within a predetermined range.

If it is determined that the gaze position has not moved (NO in S142), the sound providing unit 160 continues to provide the user with the sound corresponding to the gaze position determined in the previous processing (Step S144). That is, if it is determined in the previous processing that the gaze position is not in the boundary portion 96 (NO in S120), the sound providing unit 160 provides the sound of the area 92 corresponding to the gaze position to the user (S122). On the other hand, when it is determined in the previous processing that the gaze position is in the boundary portion 96 (YES in S120), the sound providing unit 160 provides the synthesized sound corresponding to the boundary portion 96 to the user (S132). Then, the processing flow returns to S140.

On the other hand, if it is determined that the gaze position has moved (YES in S142), the processing flow returns to S110. That is, the gaze position determination unit 150 determines whether or not the gaze position corresponds to the field 90 (S110). If it is determined that the gaze position does not correspond to the field 90 (NO in S110), the gaze position determination unit 150 determines that the sound in the field 90 is not provided to the user. On the other hand, if it is determined that the gaze position corresponds to the field 90 (YES in S110), the gaze position determination unit 150 determines that the sound in the field 90 is to be provided to the user. Then, the processes from S120 are repeated. In this manner, when the user is gazing at the field 90, the user can continue to listen to the sound corresponding to the gaze position.

Second Example Embodiment

Next, a second example embodiment will be described with reference to the drawings. In order to clarify the explanation, the following descriptions and the drawings are omitted and simplified as appropriate. Further, throughout the drawings, the same components are denoted by the same reference symbols and overlapping descriptions are omitted as necessary. The system configuration according to the second example embodiment is substantially the same as that shown in FIG. 3, and therefore the description thereof will be omitted. The configuration of the sound processing apparatus 100 according to the second example embodiment is substantially the same as that shown in FIG. 4, and therefore the description thereof will be omitted. The second example embodiment differs from the first example embodiment in that a specific sound is provided to the user even when the user gazes at a specific area outside the field 90.

Figure 9:
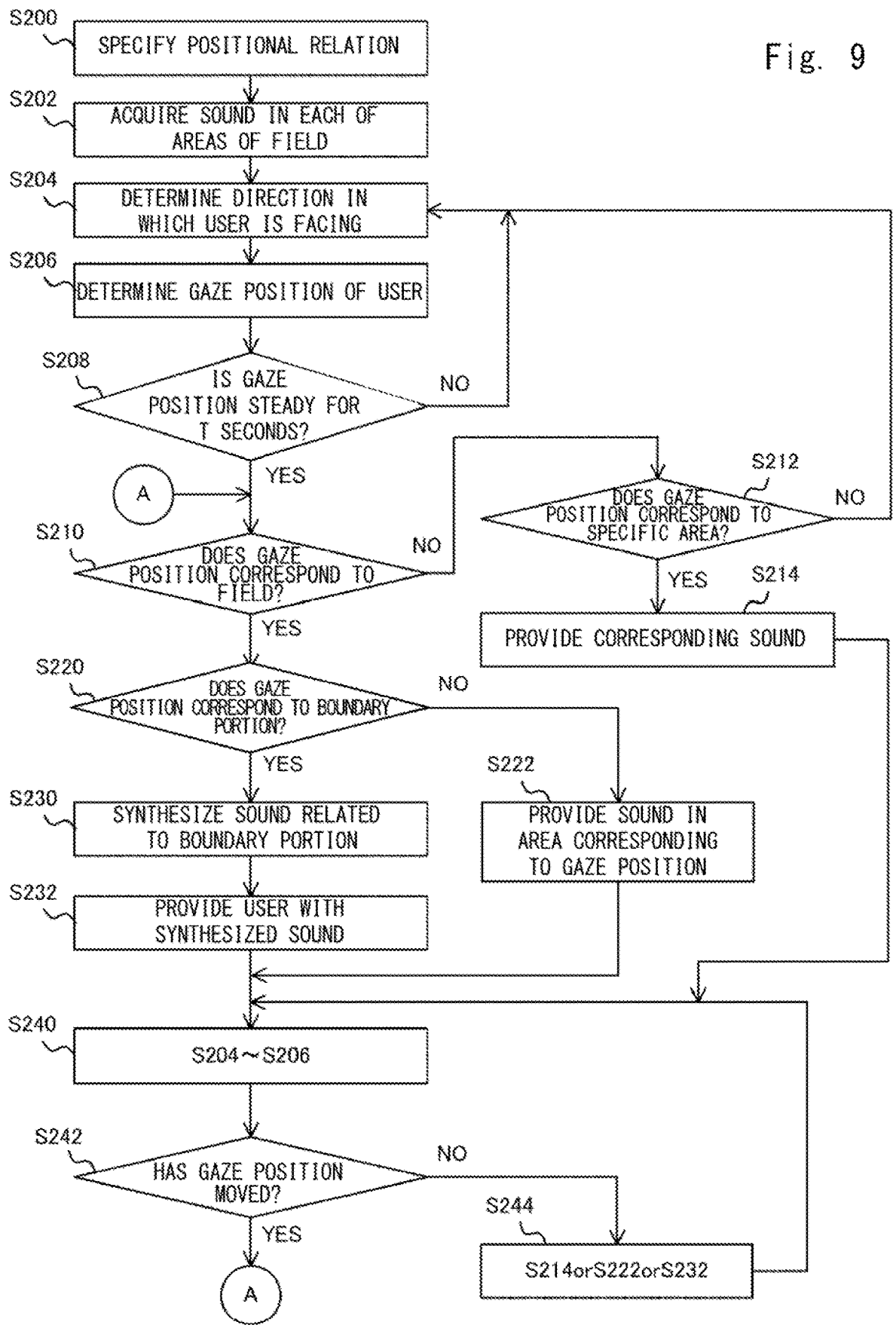
FIG. 9 is a flowchart showing a sound processing method executed by a sound processing apparatus according to a second example embodiment.

FIG. 9 is a flowchart showing a sound processing method executed by the sound processing apparatus 100 according to the second example embodiment. The processes of S200 to S244 are substantially the same as the processes of S100 to S144 shown in FIG. 6 respectively, and therefore the description thereof will be omitted. The processing in the case of NO in S210 is different from the processing in the case of that of the first example embodiment.

If it is determined that the gaze position does not correspond to the field 90 (NO in S210), the gaze position determination unit 150 determines that the user is not gazing at the field 90. In this case, the gaze position determination unit 150 determines that the sound in the field 90 is not provided to the user. In the second example embodiment, the gaze position determination unit 150 further determines whether or not the gaze position corresponds to a specific area outside the field 90 (Step S212). Specifically, the gaze position determination unit 150 determines whether or not the gaze coordinates corresponding to the gaze position are included in a specific area by using specific area position information indicating the position (range) of the specific area.

If it is determined that the gaze position corresponds to the specific area outside the field 90 (YES in S212), the gaze position determination unit 150 determines that the user is gazing at the specific area outside the field 90. In this case, the gaze position determination unit 150 determines that a sound corresponding to the specific area which the user is gazing at is to be provided to the user. The sound providing unit 160 provides the sound corresponding to the specific area to the user (Step S214). Then, the processing flow proceeds to S240.

Here, the sound corresponding to the specific area can be a predetermined sound different from the sound acquired from the sound collection device 70. The sound corresponding to the specific area may be, for example, a sound related to a commentary of an event currently being held in the field 90. When the event being held in the field 90 is a sport event, the sound corresponding to the specific area may be a sound indicating the commentary of the sport, a play-by-play commentary, the progress of the game, a profile of the team, etc. Alternatively, the sound corresponding to the specific area may be, for example, a sound relating to an advertisement or the like not related to the event.

On the other hand, if it is determined that the gaze position does not correspond to the specific area outside the field 90 (NO in S212), the gaze position determination unit 150 determines that the user is not gazing at either the field 90 or the specific area. In this case, the gaze position determination unit 150 determines that the sound corresponding to the field 90 and the specific area is not provided to the user. In this case, the processing flow returns to S204.

Figure 10:
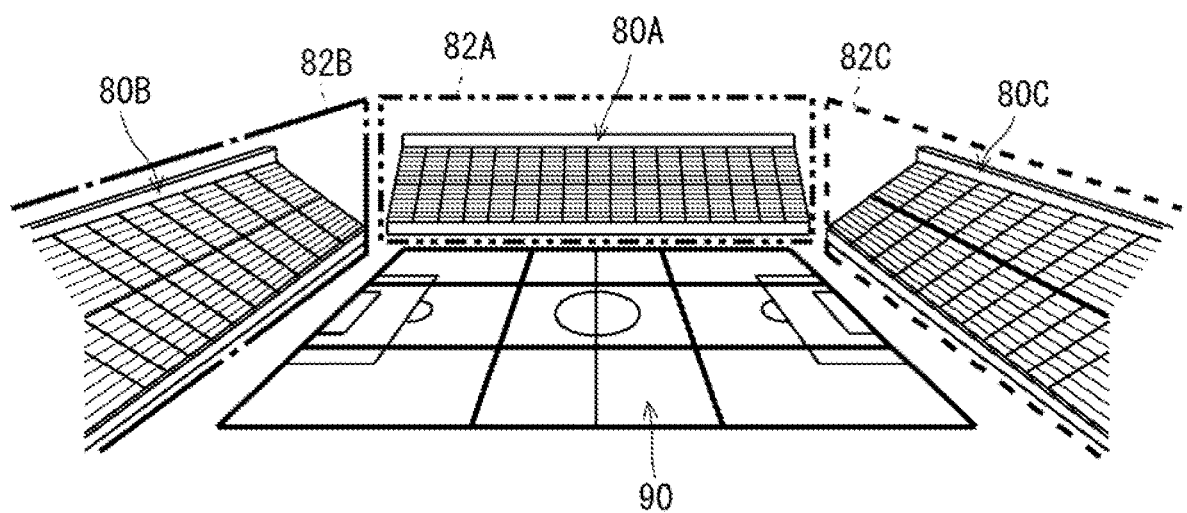
FIG. 10 is a diagram for describing a specific area outside the field, according to the second example embodiment.

FIG. 10 is a diagram for describing a specific area outside the field 90, according to the second example embodiment. FIG. 10 shows the field 90 and spectator stands 80 (80A to 80C) disposed around the field 90. In this case, the specific area position information may indicate a range including at least a part of the spectator stand 80 as the specific area 82 (82A to 82C). Therefore, when a certain position outside the field 90 is designated, it is possible to determine whether or not the position corresponds to any one of the specific areas 82A to 82C. When the user gazes at any of the specific areas 82A to 82C, the user can listen to a sound different from the sound collected by the sound collection device 70. The specific area need not correspond to the spectator stand 80.

The same sound may be associated with the specific areas 82A to 82C, or different sounds may be associated with the specific areas 82A to 82C, respectively. For example, if the event is a soccer game, the specific area 82A may be associated with a sound for explaining the progress of the game in the middle or a sound of a play-by-play commentary. The specific area 82B A may be associated with a sound for introducing one team or explaining the game result of the team. On the other hand, the specific area 82C may be associated with a sound for introducing the other team or explaining the game result of the other team. Although not shown in FIG. 10, a range including at least a part of an advertisement board posted outside the field 90 may be designated as a specific area 82, and the specific area 82 may be associated with a sound indicating an advertisement corresponding to the advertisement board. Further, if the user device 60 is an AR glass, when the user gazes at the specific area 82A to 82C, the user device 60 may display a video image corresponding to the gazed specific area 82 together with the sound corresponding to the gazed specific area 82.

The sound processing apparatus 100 according to the second example embodiment is configured to provide the sound corresponding to the specific area 82 to the user when the user is gazing at the specific area 82 outside the field 90. Accordingly, the user can listen to sound of the commentary of the event or the like other than the sounds of the respective areas 92 of the field 90. Therefore, the user can selectively listen to the sound of the commentary of the event or the like only by changing the gaze position.

Third Example Embodiment

Next, a third example embodiment will be described with reference to the drawings. In order to clarify the explanation, the following descriptions and the drawings are omitted and simplified as appropriate. Further, throughout the drawings, the same components are denoted by the same reference symbols and overlapping descriptions are omitted as necessary. The system configuration according to the third example embodiment is substantially the same as that shown in FIG. 3, and therefore the description thereof will be omitted. The configuration of the sound processing apparatus 100 according to the third example embodiment is substantially the same as that shown in FIG. 4, and therefore the description thereof will be omitted. The third example embodiment differs from other example embodiments in that a sound in an area which a large number of users are gazing at is also provided to other users.

Figure 11:
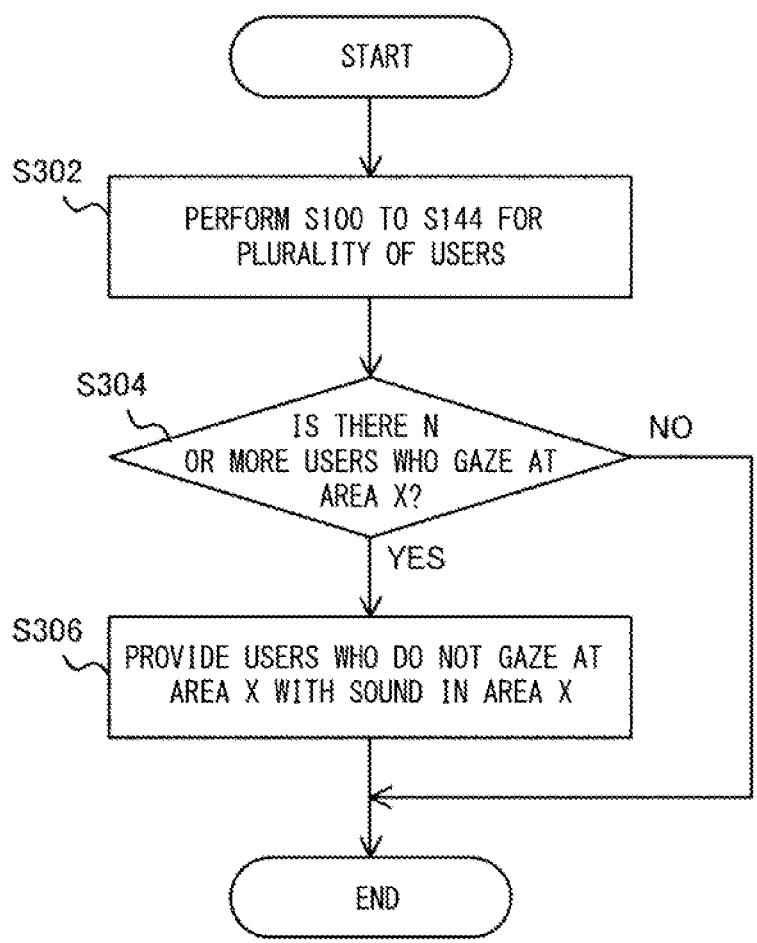
FIG. 11 is a flowchart showing a sound processing method executed by a sound processing apparatus according to a third example embodiment.

FIG. 11 is a flowchart showing a sound processing method executed by the sound processing apparatus 100 according to the third example embodiment. The sound processing apparatus 100 performs the processes of S100 to S144 shown in FIG. 6 for a plurality of users (Step S302). Next, the sound providing unit 160 (or the gaze position determination unit 150) of the sound processing apparatus 100 determines whether or not there are N or more users who gaze at an arbitrary area 92X (an area X; a first area) (Step S304). That is, the sound providing unit 160 (or the gaze position determination unit 150) determines whether or not there is an area 92 which N or more users gaze at. N is a predetermined number. N may be a fixed value or may be set in accordance with the number of spectators or the capacity of the spectator stand. For example, N may be greater than or equal to 50% of the total number of spectators in the spectator stand. That is, N can be greater than or equal to half the number of spectators at the event.

If, for each of all the areas 92X (areas X), fewer than N users gaze at the area 92X, that is, if there is no area 92 which N or more users gaze at (NO in S304), the process in S306, which will be described later, is not executed, and the process flow ends. In this case, the process flow may return to the process in S302. On the other hand, if there are N or more users who gaze at a certain area 92X (YES in S304), the sound providing unit 160 provides the sound regarding the area 92X to other users who do not gaze at the area 92X (Step S306). That is, when the gaze positions of the first users, which are a predetermined number or more of users, correspond to the area 92X (first area) among a plurality of the areas 92, the sound providing unit 160 performs processing for providing the sound regarding the area 92X to a user other than the first user.

For example, in the example of FIG. 5, it is assumed that N or more users are gazing at the area 92B and a user Y is not gazing at the field 90. In this case, it is assumed that a user Z is gazing at the area 92H. In this case, the sound providing unit 160 provides the sound in the area 92B to the users Y and Z. When the sound output devices 62 of the users Y and Z are provided with a plurality of speakers or earphones (right and left speakers or earphones, etc.), the sound in the area 92B may be output from one speaker or earphone.

The sound processing apparatus 100 according to the third example embodiment is configured to provide the sound in the area 92 which many users gaze at, to other users. There is a high possibility that a highly interesting happening with high attention is occurring in the area 92 which many users gaze at. Therefore, according to the configuration according to the third embodiment, even a user who does not see the highly interesting happening with high attention can be provided with the sound regarding the happening.

Modified Examples

Note that the present invention is not limited to the aforementioned example embodiments and may be changed as appropriate within the scope of the present invention. For example, the above-described example embodiments can be mutually applied. For example, the configuration of the third example embodiment may be combined with the second example embodiment. The same is applicable to other example embodiments.

In the flowchart described above, the order of the processes (steps) can be changed as appropriate. One or more of a plurality of processes (steps) may be omitted. For example, the process in S108 in FIG. 6 may be omitted. The processes of S120, S130, and S132 in FIG. 6 may be omitted. That is, even if the gaze position is at the boundary portion 96, it is not necessary to provide the synthesized sound to the user. The same is applicable to FIG. 9.

Further, in a case where it is determined, in the process of S142 in FIG. 6, that the gaze position has moved, the provision of the sound may be stopped when the moving acceleration thereof is greater than a predetermined value. This is because if the moving acceleration of the gaze position is large, there is a possibility that the user does not want to be provided with the sound.

In the aforementioned examples, the program can be stored using any type of non-transitory computer readable medium and provided to the computer. The non-transitory computer readable media include various types of tangible storage media. Examples of the non-transitory computer readable medium include a magnetic storage medium (such as a flexible disk, a magnetic tape, and a hard disk drive), an optical magnetic storage medium (such as a magneto-optical disk), a CD-ROM (Read Only Memory), a CD-R, a CD-R/W, and a semiconductor memory (such as a mask ROM, a PROM (Programmable ROM), an EPROM (Erasable PROM), a flash ROM, and a RAM (Random Access Memory)). The program may be provided to a computer using various types of transitory computer readable media. Examples of the transitory computer readable medium include an electric signal, an optical signal, and an electromagnetic wave. The transitory computer readable medium can supply the program to a computer via a wired communication line, such as an electric wire and an optical fiber, or a wireless communication line.

While the present invention has been described above with reference to the example embodiments, the present invention is not limited by the aforementioned descriptions. Various changes that can be understood by one skilled in the art may be made within the scope of the invention to the configurations and the details of the present invention.

This application is based upon and claims the benefit of priority from Japanese patent application No. 2020-56340, filed on Mar. 26, 2020, the disclosure of which is incorporated herein in its entirety by reference.

REFERENCE SIGNS LIST

1 Sound Processing Apparatus
2 Positional Relation Specifying Unit
4 Sound Acquisition Unit
6 Direction Determination Unit
8 Gaze Position Determination Unit
10 Sound Providing Unit
50 Sound Processing System
52 Network
60 User Device
61 Communication Unit
62 Sound Output Device
64 Photographing Device
66 Attitude Detection Unit
68 Line-Of-Sight Detection Unit
69 Display Unit
70 Sound Collection Device
80 Spectator Stand
82 Specific Area
90 Field
92 Area
94 Boundary
96 Boundary Portion
100 Sound Processing Apparatus
112 User Information Storage Unit
114 Field Information Storage Unit
120 Positional Relation Specifying Unit
130 Sound Acquisition Unit
140 Direction Determination Unit
150 Gaze Position Determination Unit
152 Sound Synthesizing Unit
160 Sound Providing Unit

What is claimed is:

1. A sound processing apparatus comprising:
hardware, including a processor and memory;
positional relation specifying unit implemented at least by the hardware and configured to specify a positional relation between a field, where an event is held and around which a spectator stand for a plurality of spectators is provided, and at least one user in the spectator stand;
sound acquisition unit implemented at least by the hardware and configured to acquire a sound from at least one sound collection device that collects a sound in each of a plurality of predetermined areas related to the field;
direction determination unit implemented at least by the hardware and configured to determine a direction in which the user is facing;
gaze position determination unit implemented at least by the hardware and configured to determine a gaze position which is a position viewed by the user based on the specified positional relation and the determined direction;
sound synthesizing unit implemented at least by the hardware and configured to integrate, when the gaze position corresponds to a boundary portion provided near a boundary of two or more adjacent areas, the sounds related to the two or more areas corresponding to the boundary portion, and generate a synthesized sound which is acquired by integrating the sounds; and sound providing unit implemented at least by the hardware and configured to perform processing for providing the user with the sound related to the area corresponding to the determined gaze position, wherein when the gaze position corresponds to the boundary portion, the sound providing unit performs processing for providing the user with the synthesized sound.

2. The sound processing apparatus according to claim 1, wherein the sound acquisition unit acquires sounds from a plurality of the sound collection devices disposed in each of the plurality of areas.

3. The sound processing apparatus according to claim 1, wherein the sound synthesizing unit generate the synthesized sound in such a manner that a proportion of a sound regarding the area close to the gaze position in the boundary portion, among the two or more areas corresponding to the boundary portion, is increased.

4. The sound processing apparatus according to claim 1, wherein, when the gaze position corresponds to a specific area outside the field, the sound providing unit performs processing for providing the user with a sound corresponding to the specific area, the sound being a predetermined sound different from a sound acquired from the sound collection device.

5. The sound processing apparatus according to claim 4, wherein a sound corresponding to the specific area is a sound related to the event being held in the field.

6. The sound processing apparatus according to claim 1, wherein, when gaze positions of first users, which are a predetermined number or more of users, correspond to a first area among the plurality of areas, the sound providing unit performs processing for providing a sound regarding the first area to a user other than the first users.

7. The sound processing apparatus according to claim 6, wherein the predetermined number is greater than or equal to half of the spectators at the event.

8. A sound processing method, comprising:

specifying a positional relation between a field, where an event is held and around which a spectator stand for a plurality of spectators is provided, and at least one user in the spectator stand;

acquiring a sound from at least one sound collection device that collects a sound in each of a plurality of predetermined areas related to the field;

determining a direction in which the user is facing;

determining a gaze position which is a position viewed by the user based on the specified positional relation and the determined direction;

integrating, when the gaze position corresponds to a boundary portion provided near a boundary of two or more adjacent areas, the sounds related to the two or more areas corresponding to the boundary portion, and generating a synthesized sound which is acquired by integrating the sounds; and providing the user with the sound related to the area corresponding to the determined gaze position, wherein when the gaze position corresponds to the boundary portion, the providing the user with the sound related to the area corresponding to the determined gaze position comprises providing the user with the synthesized sound.

9. A non-transitory computer readable medium storing a program for causing a computer to execute the following steps of:

specifying a positional relation between a field, where an event is held and around which a spectator stand for a plurality of spectators is provided, and at least one user in the spectator stand;

acquiring a sound from at least one sound collection device that collects a sound in each of a plurality of predetermined areas related to the field;

determining a direction in which the user is facing;

determining a gaze position which is a position viewed by the user based on the specified positional relation and the determined direction;

integrating, when the gaze position corresponds to a boundary portion provided near a boundary of two or more adjacent areas, the sounds related to the two or more areas corresponding to the boundary portion, and generating a synthesized sound which is acquired by integrating the sounds; and providing the user with the sound related to the area corresponding to the determined gaze position, wherein when the gaze position corresponds to the boundary portion, the providing the user with the sound related to the area corresponding to the determined gaze position comprises providing the user with the synthesized sound.

* * * * *